April 12, 1960   J. E. KNOBLOCK ET AL   2,932,291
VALVE GEAR
Filed July 7, 1958   3 Sheets-Sheet 1
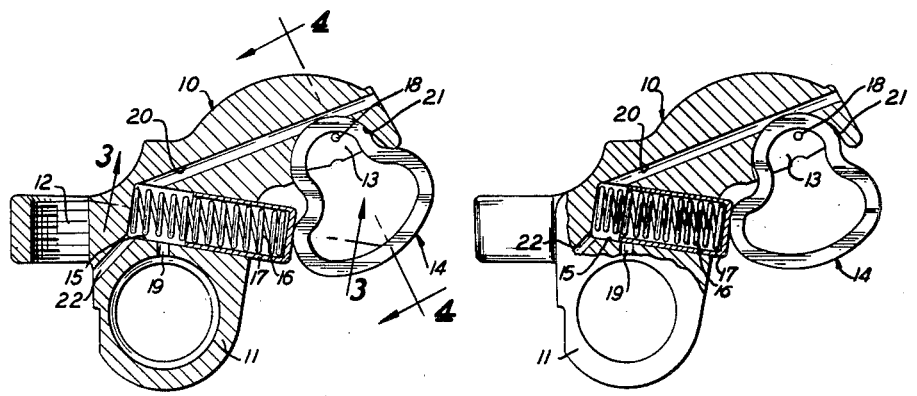
FIG.1   FIG.2
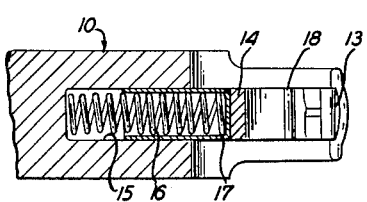   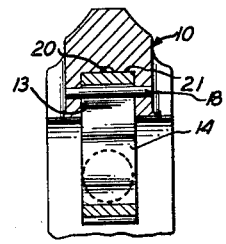
FIG.3   FIG.4
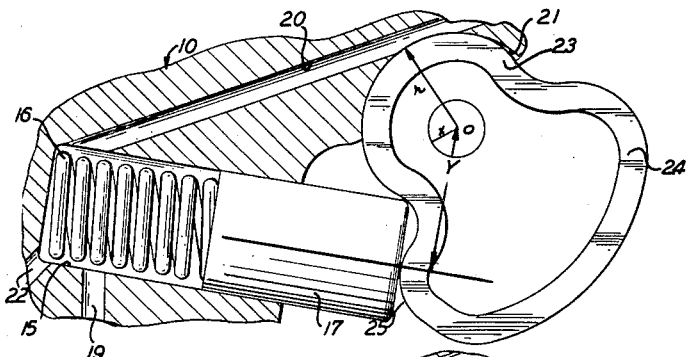
FIG.5
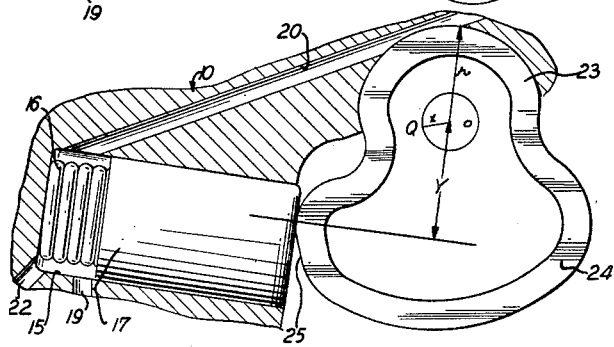
FIG.6
J.E. KNOBLOCK
R.G. MOULTON
INVENTOR.
BY
ATTORNEYS

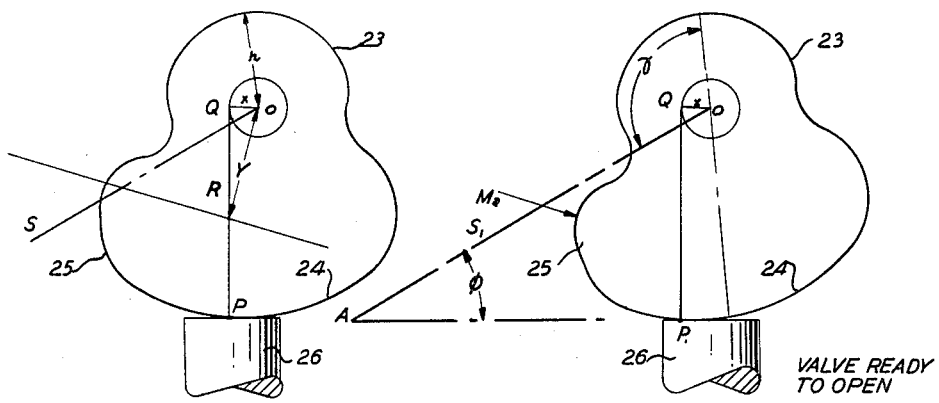
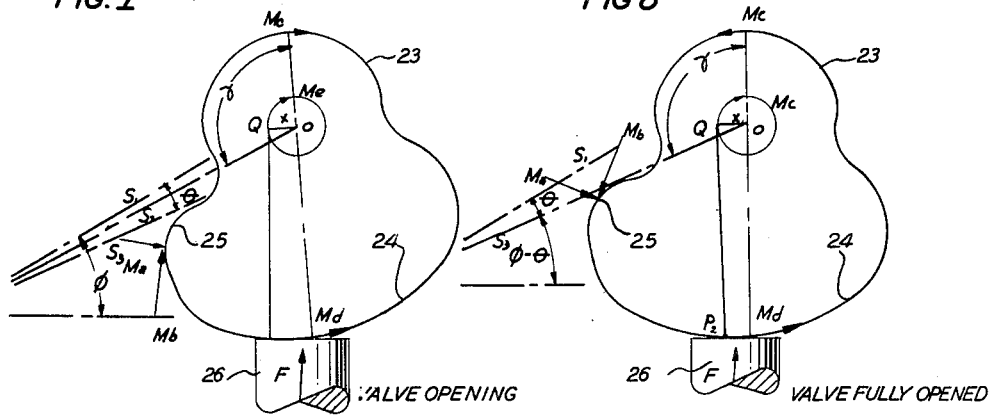
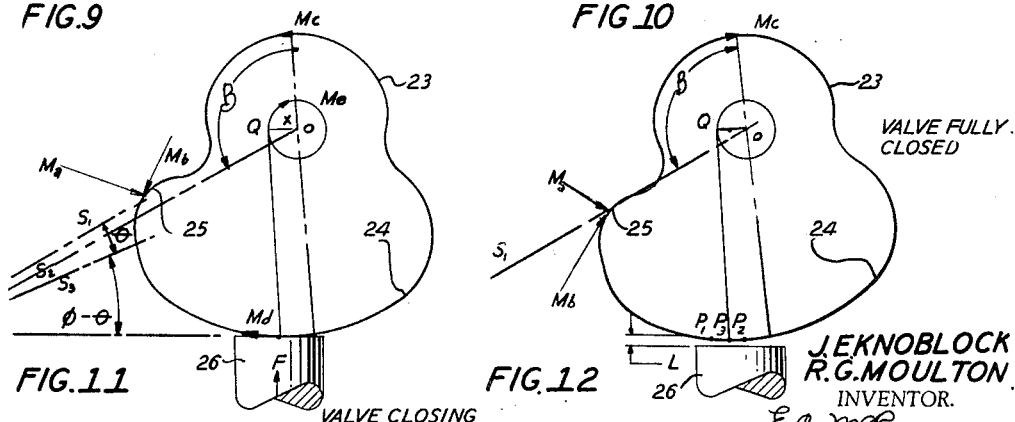

April 12, 1960   J. E. KNOBLOCK ET AL   2,932,291
VALVE GEAR

Filed July 7, 1958   3 Sheets-Sheet 3

J.E. KNOBLOCK
R.G. MOULTON
INVENTORS

BY E. C. McRae
J. R. Faulkner
E. H. Oster
K. L. Jerschling
ATTORNEYS

United States Patent Office 2,932,291
Patented Apr. 12, 1960

2,932,291

VALVE GEAR

John E. Knoblock, Detroit, and Rexford G. Moulton, Dearborn, Mich., assignors to Ford Motor Company, Dearborn, Mich., a corporation of Delaware Application July 7, 1958, Serial No. 781,823

18 Claims. (Cl. 123—90)

This application is a continuation-in-part of application Serial No. 668,098, filed June 26, 1957, now abandoned.

This invention relates to a valve gear and more particularly to such a valve gear that eliminates slack or lash in the valve gear train.

One commonly used mechanism for eliminating slack or lash in valve gear trains is the hydraulic valve lifter in which changes in the length of the valve gear trains are compensated for by varying the volume of an oil body which is made a part of the valve gear train. These devices possess certain inherent disadvantages as they are relatively expensive, may become inoperative because of sticking, are noisy immediately after the starting of the engine, and require that a highly detergent oil be used as a lubricant in the engine.

Various mechanical slack adjustors or valve compensating mechanisms have been proposed. Typical of such devices are the mechanisms disclosed in U.S. Patent 1,950,590 to G. P. Berry and the present invention is intended as an improvement thereon. In these devices, an eccentric cam mounted on the end of a rocker arm is used to actuate a valve. This cam is loaded by a cam spring to rotate the high side of the eccentric toward the end of the valve stem thereby compensating for any change in the valve gear train length occasioned by thermal changes, wear, or the presence of foreign particles in the gear train. During part of the operating cycle, the cam is designed to be frozen with respect to the rocker arm, while during the remaining portion of the operating cycle the cam is designed to be rotated with respect to the rocker arm. The moments tending to cause rotation of the cam with respect to the rocker arm in both a clockwise and counterclockwise direction are brought about by the action of the cam spring, the force of the valve spring operating through the valve stem, and frictional moments between the cam and the rocker arm and between the cam and the end of the valve stem. For proper operation, the magnitude of these moments is critical and the same values of moments for each particular position in the operating cycle should be maintained at any speed at which the engine is designed to be operated and throughout its usable life.

Prior art devices typified by the patent to Berry do not give these stabilized moments necessary for proper operation. For example, the moment generated by the spring tending to rotate the cam within the rocker arm changes and depends upon the tension in the spring. Furthermore, the frictional moment generated between the cam and the rocker arm may diminish as the coefficient of friction changes between these two members due to a polishing action between them.

The present invention seeks to stabilize the values of the various moments acting on an eccentric and thus produce a self-adjusting mechanism which performs properly at all speeds and throughout the life of the engine in which it is mounted.

Briefly, the invention contemplates the provision of a rocker arm preferably constructed of a metal selected from the group consisting of aluminum, magnesium, zinc and their alloys which has a curved bearing portion in the region designed to operate a valve of an internal combustion engine. An eccentric of irregular configuration but having a complementary curved portion is positioned against the curved bearing portion of the rocker arm. The eccentric rotates in the rocker arm about the center of these curved portions with the complementary curved portion of the eccentric engaging the curved bearing surface of the rocker arm. It has been found that the proper frictional moment can be generated by this arrangement with its rather long moment arm, and that this frictional moment will remain stable throughout the expected life of modern automobile engines.

The working face of the eccentric may take the form of an involute so that the moment on the eccentric due to the force between the valve stem and the eccentric will remain proportional to the spring force exerted by the valve spring irrespective of the rotational position of the eccentric with respect to the rocker arm. A helical spring having a piston coaxially positioned thereover is mounted in the rocker arm so that the end of the piston bears on a third portion of the eccentric. This portion of the eccentric is shaped so that the moment produced by the spring tending to rotate the eccentric with respect to the rocker arm will remain substantially constant for all rotational positions of the eccentric with respect to the rocker arm. This configuration is designed so that the moment arm between the center of rotation of the eccentric and the point where the piston contacts this portion of the eccentric is inversely proportional to the force exerted by the spring through said piston.

In operation, the eccentric is frozen in a non-rotational position with respect to the rocker arm during the valve opening portion of the cycle and as a consequence, the working face of the eccentric slides across the face of the valve stem. When the valve is being closed, the eccentric rotates with respect to the rocker arm and the working face rolls across the valve stem. However, the distance traversed by the valve stem on the eccentric is greater during the valve opening portion of the operating cycle than during the valve closing portion of the operating cycle thereby creating a small lash between the eccentric and the face of the valve stem when the rocker arm reaches the limit of its travel at the valve closed position. The helical spring mentioned above then rotates the eccentric so that it again comes into contact with the valve stem. If the valve train length has remained constant, the valve stem will contact the eccentric at the start of the new cycle exactly at the same point as in the preceding cycle. However, if the valve train has changed length during the cycle, the eccentric will be rotated by the spring to a new position and the change in length in the valve gear train will have been compensated. As will be explained below, the value of the moments acting on the eccentric is critical to proper operation of the mechanism as described and this invention seeks to provide mechanisms for controlling and stabilizing these moments.

Accordingly, an object of the present invention is the provision of a mechanical self-adjusting rocker arm mechanism capable of proper operation at any speed of operation and throughout the life of the engine.

Another object is to provide a self-adjusting rocker arm mechanism in which the moments tending to produce rotation of an eccentric in the rocker arm are closely controlled and maintained throughout the usable life of the engine in which they are mounted.

A further object is the provision of a simple, rugged and inexpensive self-adjusting rocker arm mechanism for use on internal combustion engines.

The invention can be best understood by reference to the drawings in connection with the following description in which:

Figure 1 depicts a cross sectional view of the self-adjusting rocker arm mechanism;

Figure 2 is a partial cross sectional view similar to that of Figure 1 with the eccentric and spring in a different position;

Figure 3 is a partial sectional view taken along the line 3—3 of Figure 1;

Figure 4 is a partial sectional view taken along the line 4—4 of Figure 1;

Figure 5 is a partial enlarged view showing the eccentric in an extreme outboard position;

Figure 6 is a partial enlarged view showing the eccentric in an extreme inboard position;

Figure 7 is a schematic depicting the geometry of the mechanism;

Figure 8 is a schematic depicting the mechanism when the valve is ready to open;

Figure 9 is a similar view showing the moments acting on the eccentric as the valve is opening;

Figure 10 shows the moments acting when the valve is fully opened;

Figure 11 depicts the moments acting when the valve is closing;

Figure 12 shows the lash or slack created when the valve has fully closed and the moments acting on the eccentric as the lash is taken up;

Figure 13:
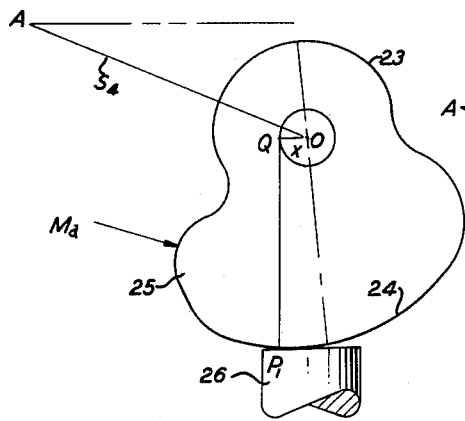
Figure 13 is a schematic view in part similar to Figure 8 depicting the mechanism positioned for fourth quadrant operation.

Referring now to Figures 1 through 4, the invention comprises a rocker arm 10 preferably composed of a metal selected from the group consisting of aluminum, magnesium, zinc and their alloys. For example, a rocker arm made of aluminum alloy, SAE 308 or 322, is admirably suited for the purposes of this invention. The rocker arm has a hub 11 for rotational mounting on a shaft (not shown), a bore 12 for reception of a portion of the push rod mechanism of an internal combustion engine, a portion 13, for receiving an eccentric 14 of irregular configuration, and a bore 15 for the reception of a helical spring 16 and a coaxially mounted piston 17 which transmits the force of the spring to the eccentric 14. A pin 18 is positioned in the rocker arm solely to hold the eccentric 14, spring 16 and piston 17 in place prior to the positioning of the rocker arm assembly in an engine; after the rocker arm assembly has been so placed, the pin serves no useful function.

Lubrication of the rocker arm assembly is accomplished by means of oil channels 19, 20 and 22. Oil is supplied under low pressure from the rocker arm shaft (not shown) to the bore 15 in which spring 16 and piston 17 are located by means of oil channel 19, and flows to lubricate the eccentric through channel 20 and to lubricate the push rod through channel 22. It is thus apparent that bore 15 is completely filled with oil at all times and that this oil surrounds the spring 16 and operates upon the piston 17 providing a dampening effect upon the spring as it is alternately compressed and expanded. This provides an additional desirable feature over prior art devices in that all tendency for flutter in the spring 16 which biases the eccentric is eliminated by this dampening means.

The eccentric 14 can be formed by an extrusion, rolling or sintering process and is preferably composed of steel, which is subjected to a case hardening process to provide surfaces of sufficient hardness to withstand the heavy loading and frictional forces between the eccentric and the valve rocker arm, and between the eccentric and the valve stem. The geometrical configuration of the eccentric 14 is important in that it contributes substantially to the provision of the proper rotational moments acting on the eccentric. As apparent from a consideration of Figures 5, 6 and 7, the eccentric 14 comprises an upper curved portion 23 which may be a segment of a circle having a radius $r$, and which bears upon curved bearing surface 21, a lower portion or working face 24 which may be an involute of a circle $x$ or other similar geometric curves. The lower portion or working face 24 is an involute of a circle, said circle having its center at the point O and having a radius $x$ which permits the valve spring (not shown) to exert a rotational moment on the eccentric through the valve stem by means of the eccentricity $x$. Joining the two surfaces 23 and 24 is an irregular shaped surface 25 which is generated by graphical methods. As pointed out previously, the moment exerted by the spring 16 on the eccentric 14 is maintained substantially constant by varying the moment arm between the center of rotation of the eccentric and the point where the piston 17 contacts the eccentric inversely to the force exerted by the spring 16. It is well known that the force exerted by a helical spring is approximately proportional to its deformation, and this fact is used to generate the surface 25 which is the locus of all points where the force exerted by the spring, which is represented by the position of piston 17, is inversely proportional to the moment arm of the spring or the distance $y$ as shown on Figures 5, 6, and 7, as the eccentric is rotated from its extreme outboard position as shown in Figure 5 to its extreme inboard position as shown in Figure 6. This configuration provides a means for supplying a substantially constant moment acting on the eccentric 14 through spring 16 and piston 17.

Referring now to Figures 7 through 12, the operation of the device will be explained. Figure 7 represents the geometry of the rocker arm assembly and shows the radius $r$ of the curved portion 23 of the eccentric 14, the "leg" R of the involute of the working face 24, the eccentricity $x$ which is the radius of the circle from which the involute of working face 24 of the eccentric is generated and the moment arm Y of the spring 16. The line S is drawn from the center of the bore in the hub 11 (the center of rotation of the rocket arm 10), to the point O, the center of rotation of the eccentric, and represents the rocker arm 10 as a whole.

Figure 8 shows the assembly in the normal valve closed position, set by a conventional rocker arm adjusting screw, with negligible force being exerted by the rocker assembly on the valve stem designated by the numeral 26. The angle subtended between a plane perpendicular to the axis of the valve 26 and the line S1, drawn between the center of rotation of the rocker arm A, and the center O of the upper surface 23 of the eccentric is designated by the symbol phi while the angle between the line S1, and an extension of an arbitrary line drawn through the center O and the midpoint of the working face 24 is designated by the symbol alpha. If the working face 24 is an involute or other similar surface, the point Q is that point from which a line must be extended tangent to the circle of the involute to intersect the working face 24 at the point P, where the working face contacts the valve stem 26. In this position, as illustrated, the moment, Ma, due to the force of the spring 16 will rotate the eccentric counterclockwise with respect to the rocker arm to bring the high side of the working face 24 into contact with the valve stem.

Figure 9 depicts the eccentric and the moments acting thereon when the valve is opening. The lines S2 and S3 are drawn between the center of rotation A of the rocker arm 10 and the point O, the center of rotation of the eccentric 14, when the valve is partially opened and when it is fully opened respectively. The angle theta is the angle subtended between the lines $S_1$ and $S_3$ representing the valve closed position and the valve open position. If the angle phi is greater than the angle theta, as it apparently is from an inspection of Figures 9 and 10, the center O and the point Q move across the valve stem away from the rocker arm shaft as the valve opens. The eccentric then tends to roll across the valve stem in a clockwise direction with respect thereto. Also, if the angle alpha would tend to decrease as the valve opens as it apparently does from an inspection of Figures 9 and 10 since the line S moves from position $S_1$ to $S_3$, the eccentric will tend to rotate counterclockwise with respect to the rocker arm. Thus, when the valve is opening as well as when it is closing, the following moments created by dynamic loading act upon the eccentric:

(1) Ma, the moment created by the action of the helical spring upon the eccentric; this moment acts upon the eccentric at all times during the valve cycle and its direction is counterclockwise at all times;

(2) Me, the moment created by the force of the valve spring acting through the eccentricity x. This moment is clockwise at all times during its action upon the eccentric.

The following moments created by friction act upon the eccentric during the various portions of the operating cycle. Their direction is opposite to the direction which the eccentric tends to rotate with respect to the various mechanisms upon which it bears. Although these moments change in magnitude due to the variable loading of the eccentric by the valve spring, the ratio of their magnitudes is constant:

(3) Mb, the moment caused by friction between the face of the piston 17 and the irregular surface 25 of the eccentric;

(4) Mc, the moment caused by friction between the curved portion 23 of the eccentric and the curved bearing surface 21 of the rocker arm;

(5) Md, the moment caused by friction between the working face 24 of the eccentric and the face of the valve stem 26. During the valve opening portion of the cycle, the moments Mb and Mc act in a clockwise direction since the eccentric 14 tends to rotate in a counterclockwise direction with respect to the rocker arm 10 and the piston 17. The direction of the moment Md during the valve opening portion of the cycle is counterclockwise since it is the motivating force which tends to move the eccentric 14 in the counterclockwise direction with respect to the rocker arm 10. During the valve closing portion of the cycle, the direction of these moments is reversed as the eccentric rotates clockwise with respect to the rocker arm 10 and the piston 17 and counterclockwise with respect to the valve stem; thus Mb and Mc act in a counterclockwise direction while Md acts in a clockwise direction.

It should be clearly understood that in the discussion of the direction of the moments acting on the eccentric, their direction is given in relation to the mechanism as illustrated, and that if a view were taken from the opposite side of the rocker arm mechanism, these directions would be reversed.

As explained previously, the magnitudes of the above mentioned moments are designed so that the eccentric "freezes" in the rocker arm and slides across the valve stem as the valve opens. To prevent rotational movement between the eccentric and the rocker arm and a rolling of the eccentric across the valve stem as the geometry of the system would dictate, the sum of the moments in a clockwise direction, Mb+Mc+Me must be greater than the sum of the moments in a counterclockwise direction, Ma+Md.

When the valve has reached a fully open position, as shown in Figure 10, the rocker arm has been rotated from position $S_1$ to $S_3$ through the angle theta. The angle alpha has remained constant and the point of contact between the working face 24 of the eccentric and the valve stem 26 has been shifted from a point P1 to a point P2 on the lower side of the working surface 24. At this point, the rocker arm has reached its maximum travel and there is no relative motion between the rocker arm 10 and the valve stem 26, hence the direction in which the eccentric tends to rotate with respect to the rocker arm will be governed entirely by the value of the moments Ma and Me. The magnitude of the moment Me caused by the action of the valve stem spring is larger than the magnitude of the moment Ma caused by the action of the helical spring 16, hence the eccentric tends to rotate clockwise and the opposing frictional moments Mb, Mc and Md are in a counterclockwise direction.

When the valve is in this fully opened position, to preclude the possibility of the eccentric collapsing due to the moment Me, it is essential that the sum of counterclockwise moments Ma+Mb+Mc+Md equal or exceed the value of the moment Me. This condition, of course, must also prevail during the entire valve cycle.

Figure 11 depicts conditions during the valve closing portion of the cycle. It was previously explained that in the valve opening portion of the cycle the eccentric tended to rotate counterclockwise with respect to the rocker arm and clockwise with respect to the valve stem by reason of the geometry of the system. Conversely, by reason of the same geometry, the eccentric tends to rotate clockwise with respect to the rocker arm and counterclockwise with respect to the valve stem during the valve closing portion of the cycle. Because of the tendency for the eccentric to rotate in this opposite direction, the friction moments Mb, Mc, and Md are reversed from those prevailing during the valve opening portion of the cycle, with Mb and Mc acting in a counterclockwise direction and Md acting in a clockwise direction. Of course, the moments Ma and Me maintain the same direction throughout the valve cycle, counterclockwise and clockwise respectively. It is essential to the applicants' invention that the eccentric rotate in the rocker arm in a clockwise direction with respect thereto and also roll on the valve stem 26 as the valve closes. To bring this condition about, the sum of the clockwise moments Md+Me must exceed the sum of the counterclockwise moments Ma+Mb+Mc.

The eccentric will slide on the valve stem a greater distance, from P1 to P2, during the valve opening portion of the cycle than it will roll on valve stem, from P2 to P3, during the valve closing portion of the cycle as best shown in Figure 12. Thus, when the valve seats, the point of contact between the working face 24 of the eccentric and the valve stem will be at P3 and the angle alpha shown in Figure 8 will be increased to the angle beta as shown in Figure 12. The point P3 is on the lower side of the eccentric from the point P1, hence when the rocker arm 10 reaches its original position represented by the line S1, a lash L is created between the working face of the eccentric and the valve stem.

As soon as this lash is created, the spring 16 acting on the surface 25 of the eccentric 14 through the piston 17 will rotate the high side of the working face 24 back toward the original point P1 against the frictional moments Mb+Mc. If the valve train legnth has remained constant through the cycle, the point of contact will again be at point P1. However, if the valve train length has changed for any reason, such as temperature change, wear, or lodged dirt particles, the point of contact will not return to the point P1 but will be at some other point on the working face 25 of the eccentric 14, thus compensating for the change in length of the valve gear train. Therefore, a new starting point P1 will be initiated and the preceding action will be repeated during the next valve cycle. It is essential to secure the above action that the length R be sufficient to make the angle alpha shown in Figures 8, 9 and 10 increase to a new value beta as shown in Figure 12.

To recapitulate, the following conditions are deemed essential for proper operation of the invention.

(1) During the valve opening portion of the cycle, $Mb+Mc+Me$ must be greater than $Ma+Md$ so that the eccentric will "freeze" in the rocker arm.

(2) When the valve is fully opened, $Ma+Mb+Mc+Md$ must be greater than $Me$ so that the eccentric will not collapse.

(3) During the valve closing portion of the cycle, $Md+Me$ must be greater than $Ma+Mb+Mc$ to allow the eccentric to rotate in the rocker and roll on the valve stem.

(4) When the valve is fully closed, $Ma$ must be greater than $Mc+Mb$ to cause the eccentric to eliminate newly created lash L.

(5) The radius R must be of sufficient length to cause the angle alpha to increase to the angle beta during the valve closing portion of the cycle.

(6) The angle phi must be greater than the angle theta to cause the eccentric to slide across the valve stem during the valve opening portion of the cycle.

Without attempting to give any complete design characteristics and without intending to limit the invention in any way, the following numerical values, given by way of example only, have been found to produce a very satisfactory rocker arm mechanism.

| | |
|---|---|
| Coefficient of friction (Mu) | 0.07 |
| Valve spring tension F _____lbs__ | 85–185 |
| Radius of curved segment 23 ($r$) _____in__ | .372 |
| Radius of working face 24 (R) _____in__ | .82 |
| Eccentricity ($x$) _____in__ | .060 |
| Moment of the spring ($Ma$) _____inch-lbs__ | 3¾ |

Of course, an engineer skilled in the art may readily vary numerical values given above to design a mechanism suitable for any given application.

It should also be noted that centrifugal force acting on the eccentric, which may become appreciable during high speed operation acts in the same direction as the spring 16, thus aiding the spring in elimination of lash. Use of a helical spring rather than a coil spring eliminates fluctuating friction moments produced between the coils of the spring or between the spring and its housing as the spring tends to contract and expand in a radial direction as it is wound and unwound.

The provision of a curved bearing surface in the rocker arm and the complementary curved surface of the eccentric with their rather large radii supplies a comparatively large moment arm for the moment $Mc$. In comparison with a mechanism which produces the same magnitude of moment $Mc$ with a smaller moment arm, this arrangements permits considerable mnaufacturing tolerances in the dimensions of the curved bearing surface and the complementary curved surface of the eccentric without appreciably charging the magnitude of the moment $Mc$.

Thus, the present invention provides a simple, rugged and practical self-adjusting rocker arm mechanism in which the moments acting on the eccentric are stabilized, and which is capable of efficient operation at all engine speeds and throughout the expected life of an internal combustion engine.

It will be noted with respect to the foregoing description, particularly as describing Figs. 7 to 12, inclusive, that the operation of the mechanism is explained with reference to valve opening and valve closing movements. It will be further noted that the movement of the rocker arm is shown as limited to the first quadrant of a rectangular coordinate having the center or pivot axis A of the rocker arm as the origin, the longitudinal axis of the valve stem being parallel to the ordinate.

However, it should be understood that the rocker arm may rotate in the first quadrant as above described, the fourth quadrant or across a portion of both quadrants during a complete valve opening and valve closing cycle. The nature of the relative movement between the working faces of the eccentric and valve stem at any instantaneous position of the rocker arm is dependent upon the quadrant in which the rocker arm is moving and its direction of movement. In other words, the relative movement between the working faces of the eccentric and valve stem is not necessarily limited to sliding movement in valve opening direction and rolling movement in valve closing direction, as may have been implied in describing the operation of the mechanism with reference to Figs. 7 to 12, inclusive.

In describing the operation of the mechanism, it was stated that the eccentric is frozen in a non-rotational position with respect to the rocker arm during the valve opening portion of the cycle and, as a consequence, the working face of the eccentric slides across the face of the valve stem. It was further stated that when the valve is being closed, the eccentric rotates with respect to the rocker arm and the working face rolls across the face of the stem. These conditions may be defined without particular reference to valve opening and valve closing movements as follows: In operation, the eccentric is frozen in a non-rotational position with respect to the rocker arm during the portion of the cycle in which the contact point between the working faces of the eccentric and the valve stem moves away from the center of rotation A of the rocker arm, and, as a consequence, the working face of the eccentric slides across the face of the valve stem. During the remaining portion of the cycle, that is, during the portion of the cycle in which the contact point moves toward the center of rotation A, the eccentric rotates with respect to the rocker arm and the working face rolls across the valve stem.

Also, with particular reference to Figs. 7 to 12, inclusive, in which the rotation of the rocker arm is shown as being limited to the first quadrant, it was stated that the distance traversed by the valve stem on the eccentric is greater during the valve opening portion of the operating cycle than during the valve closing portion of the cycle thereby creating a small lash between the eccentric and the face of the valve stem when the rocker arm reaches the limit of its travel at the valve closed position. This may be restated as follows: The distance traversed by the valve stem on the eccentric is greater when the eccentric is frozen in the rocker arm than when the eccentric is rolling in the rocker arm thereby creating a small lash between the eccentric and the face of the valve stem when the rocker arm reaches the limit of its travel at the valve closed position. A different result will be obtained if the mechanism illustrated in Figs. 7 to 12, inclusive, is operated solely in the fourth quadrant, as will be explained.

In the explanation of the invention in terms of the movement of the contact point between the working faces of the eccentric and valve stem away from and toward the center of rotation A of the rocker arm, Fig. 8 may be considered as showing the assembly in the normal position immediately preceding the start of a clockwise first quadrant movement of the rocker arm.

In this position as illustrated, the moment $Ma$, due to the force of the spring 16, will rotate the eccentric counterclockwise with respect to the rocker arm to bring the high side of the working face 24 into contact with the valve stem to eliminate any lash or clearance.

According to the instant explanation of the invention,

Fig. 9 may be considered as depicting the eccentric and the moments acting thereon when the rocker arm is swinging in a clockwise direction through the first quadrant. As was described above, the line $S_1$ is a line drawn between the center of rotation A of the rocker arm and the point O, the center of rotation of the eccentric 14. The lines $S_2$ and $S_3$, respectively, represent positions of the rocker arm in a first instantaneous position of motion after further rotation of the rocker arm in the same direction and in the same quadrant. The angle theta is the angle subtended between the lines $S_2$ and $S_3$. If the angle phi is equal to or greater than the angle theta, as is apparent from inspection of Fig. 9, the center O and the points Q and P move across the valve stem away from the rocker arm pivot axis A as the rocker arm rotates in a clockwise direction. The eccentric then tends to roll across the valve stem in a clockwise direction. Also, as the angle alpha tends to decrease, as is apparent from inspection of Fig. 9 as the line S moves from position $S_2$ to position $S_3$, the eccentric will tend to rotate in a counterclockwise direction relative to the rocker arm. Thus, when the rocker arm is rotating in a clockwise motion in the first quadrant, the moments created by dynamic loading acting upon the eccentric are as follows:

(1) M$a$, the moment created by the action of the helical spring on the eccentric;

(2) M$e$, the moment created by the force of the valve spring acting through the eccentricity $x$;

(3) M$b$, the moment caused by friction between the face of the piston 17 and the irregular surface 25 of the eccentric;

(4) M$c$, the moment caused by friction between the curved portion 23 of the eccentric and the curved bearing surface 21 of the rocker arm;

(5) M$d$, the moment caused by friction between the working face 24 of the eccentric and the face of the valve stem 26.

The effect of these moments in terms of the quadrant in which the rocker arm is swinging, may be restated as follows:

During the clockwise rotation of the rocker arm in the first quadrant, the moments M$b$ and M$c$ act in a clockwise direction since the eccentric 14 tends to rotate in a counterclockwise direction with respect to the rocker arm 10 and the piston 17. The direction of the moment M$d$ during the same rocker arm rotation in the first quadrant is counterclockwise since it is the motivating force tending to move the eccentric 14 in the counterclockwise direction with respect to the rocker arm 10. During the counterclockwise rotation of the rocker arm in the first quadrant, the direction of these moments is reversed as the eccentric rotates clockwise with respect to the rocker arm 10 and the piston 17 and counterclockwise with respect to the valve stem; thus M$b$ and M$c$ act in a counterclockwise direction while M$d$ acts in a clockwise direction.

The magnitudes of the above mentioned moments are designed so that the eccentric "freezes" in the rocker arm and slides across the valve stem as the point of contact between the eccentric and the valve stem moves away from the center of rotation of the rocker arm. As was stated earlier, to prevent rotational movement between the eccentric and the rocker arm and a rolling of the eccentric across the valve stem as the geometry of the system would dictate, the sum of the moments in a clockwise direction, M$b$+M$c$+M$e$ must be greater than the sum of moments in a counterclockwise direction.

When the rocker arm has reached its maximum travel point in a clockwise direction in the first quadrant (the valve fully opened position corresponding to that illustrated in Fig. 10), there is momentarily no relative movement between the rocker arm 10 and the valve stem 26. The direction in which the eccentric tends to rotate with respect to the rocker arm will be governed entirely be the value of the moments M$a$ and M$e$. Since the magnitude of the moment M$e$ caused by the action of the valve stem spring is larger than the magnitude of the moment M$a$ caused by the action of the helical spring 16, the eccentric tends to rotate clockwise and the opposing frictional moments M$b$, M$c$ and M$d$ are in a counterclockwise direction.

As was also stated with respect to Fig. 10, when the valve is at the limit of its movement in a fully opened direction, it is essential that the sum of the counterclockwise moments M$a$+M$b$+M$c$+M$d$ equal or exceed the value of the moment M$e$ to preclude the possibility of the eccentric collapsing due to the moment M$e$. This condition, of course, must also prevail during the entire valve cycle.

According to the instant explanation of the invention, Fig. 11 may be considered as depicting the eccentric and the moments thereon when the rocker arm is swinging in a counterclockwise direction through the first quadrant. When the rocker arm is moving in the first quadrant in a counterclockwise direction, the point of contact between the eccentric and the valve stem is moving toward the center of rotation of the rocker arm. It was previously explained that when the point of contact moves away from the rocker arm center of rotation, the eccentric tended to rotate counterclockwise with respect to the rocker arm and clockwise with respect to the valve stem by reason of the geometry of the system. Conversely, by reason of the same geometry, the eccentric tends to rotate clockwise with respect to the rocker arm and counterclockwise with respect to the valve stem when the point of contact between the eccentric and the valve stem moves toward the rocker arm center of rotation. Because of the tendency for the eccentric to rotate in this opposite direction, the friction moments M$b$, M$c$ and M$d$ are reversed from those prevailing during the portion of the cycle in which the point of contact moves away from the rocker arm center of rotation. Of course, the moments M$a$ and M$c$ maintain the same direction throughout the valve cycle, counterclockwise and clockwise, respectively.

As was stated earlier, it is essential to the applicants' invention, particularly with reference to first quadrant operation, that the eccentric rotate in the rocker arm in a clockwise direction with respect thereto and also roll on the valve stem 26 as the valve closes. To bring this condition about, the sum of the clockwise moments M$d$+M$e$ must exceed the sum of the counterclockwise moments M$a$+M$b$+M$c$.

When the rocker arm is operating solely in the first quadrant, the eccentric will slide on the valve stem a greater distance, from $P_1$ to $P_2$, when the point of contact moves away from the rocker arm center of rotation then it will roll on the valve stem, from $P_2$ to $P_3$, when the point of contact moves toward the rocker arm center of rotation. As was described with reference to Fig. 12, when the valve 12 seats, the point of contact between the working face 24 of the eccentric and the valve stem will be at $P_3$ and the angle alpha shown in Fig. 8 will be increased to the angle beta as shown in Fig. 12. The point $P_3$ is on the lower side of the eccentric $P_1$. Hence, when the rocker arm 10 returns to its original starting position represented by the line $S_1$, a lash L is created between the working face of the eccentric and the valve stem. The spring 16 acting on the surface 25 of the eccentric through the piston 17 immediately acts to compensate for the lash by rotating the eccentric against resistance of the frictional moments M$b$ and M$c$, as has been earlier explained.

To again recapitulate, this time in terms of movement of the contact point away from and toward the center of rotation A, the following conditions are deemed essential for proper operation of the invention:

(1) When the point of contact between the eccentric and the valve moves away from the center of rocker arm rotation, $Mb+Mc+Me$ must be greater than $Ma+Md$ so that the eccentric will "freeze" in the rocker arm.

(2) When the valve is fully opened, $Ma+Mb+Mc+Md$ must be greater than $Me$ so that the eccentric will not collapse.

(3) When the point of contact between the eccentric and the valve moves toward the center of rocker arm rotation, $Md+Me$ must be greater than $Ma+Mb+Mc$ to allow the eccentric to rotate in the rocker arm and roll on the valve stem.

(4) When the valve is fully closed, $Ma$ must be greater than $Mc+Mb$ to cause the eccentric to eliminate newly created lash L.

(5) The radius R must be of sufficient length to cause the angle alpha to increase to the angle beta during the valve closing cycle.

(6) The angle phi must be greater than the angle theta to cause the eccentric to slide across the valve stem during the valve opening part of the cycle.

Figure 14:
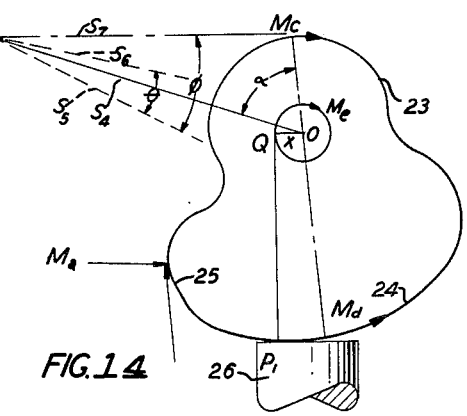
Figure 14 is a schematic view depicting the eccentric and the moments acting thereon when the rocker arm is swinging in a counterclockwise direction in the fourth quadrant.
Figure 15:
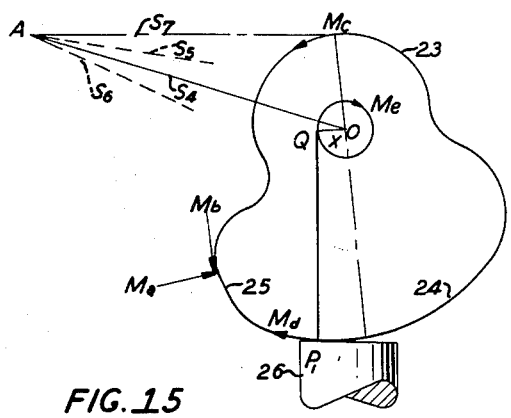
Figure 15 is a schematic view depicting the eccentric and the moments acting thereon when the rocker arm is swinging in a clockwise direction through the fourth quadrant.

Referring now to Figs. 13, 14 and 15, there are illustrated schematically the conditions of operation as they appear when the rocker arm is rotatable only in the fourth quadrant. Fig. 13 shows the assembly in the normal valve closed position in the fourth quadrant. Fig. 14 depicts the eccentric and the moments acting thereon when the rocker arm is swinging in a counter-clockwise direction through the fourth quadrant. Fig. 15 depicts the eccentric and the moments acting thereon when the rocker arm is swinging in a clockwise direction through the fourth quadrant. In these figures the line $S_4$ is the line drawn between the center of rotation A of the rocker arm and the point O, the center of rotation of the eccentric 14. The lines $S_5$ and $S_6$, respectively, represent the positions of the rocker arm in a first instantaneous position of motion and a second instantaneous position of motion after further rotation of the rocker arm in the same direction and in the same quadrant. The angle theta is the angle subtended between the lines $S_5$ and $S_6$; the angle phi is the angle between a line $S_7$ drawn through the center of rotation A normal to the longitudinal axis of the stem 26 and the line $S_5$; and the angle alpha is the angle between the line $S_4$ and the line drawn through the center O and the midpoint of the eccentric surface 24. These lines and angles have counterparts in Figs. 8 to 12, inclusive, as will be readily apparent.

The moments created by dynamic loading acting on the eccentric when the rocker arm is rotating with counterclockwise motion in the fourth quadrant are the same as those listed for rotation of the rocker arm in a clockwise motion in the first quadrant. Similarly, the moments created by dynamic loading acting on the eccentric when the rocker arm is rotating with clockwise motion in the fourth quadrant are the same as those listed for the condition in which the rocker arm is rotating in a counterclockwise direction in the first quadrant.

There is one important difference between the arrangement in which the rocker arm operates solely in the first quadrant and the arrangement in which the rocker arm operates solely in the fourth quadrant. In first quadrant operation the sliding movement occurs first, that is, on the down or clockwise movement of the rocker arm and the rolling movement occurs on the up or counterclockwise movement of the rocker arm. In fourth quadrant operation the rolling movement occurs first, that is, on the down or clockwise movement of the rocker arm and the sliding movement occurs on the up or counterclockwise movement of the rocker arm. In either case, that is, in the first or fourth quadrant movements, the general rule applies that the sliding movement is greater than the rolling movement. In the first quadrant the point of contact slides away from the center of rotation A and then rolls back a shorter distance toward the center. The net effect is that the point of contact ends up on the low side of the eccentric creating a lift loss or lash, as explained. In the fourth quadrant the point of contract rolls toward the center of rotation A and then slides back a greater distance away from the center thus ending up on the high side of the eccentric. This creates a lift gain in contradistinction to a lift loss and, therefore, no lash is created.

The foregoing thus provides a means for providing a pre-determined amount of lash in a valve gear system. It is only necessary to construct and arrange the rocker arm, eccentric and valve stem so that the rocker arm rotates between the first and fourth quadrants. The lift loss created in the first quadrant movement will be offset by the lift gain created in the fourth quadrant movement, the amount of such offset being dependent on the ratio between first and fourth quadrant movements of the rocker arm. It will be understood the first quadrant movement must be in such relationship to the fourth quadrant movement that the lift loss will exceed the lift gain in order that a lash be created.

Figure 17:
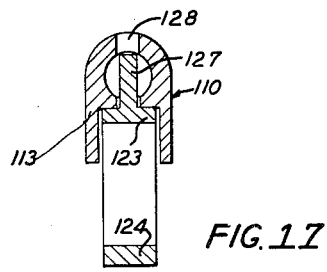
Figure 17 is a sectional view taken substantially on the line 17—17 of Figure 16 looking in the direction of the arrows.
Figure 16:
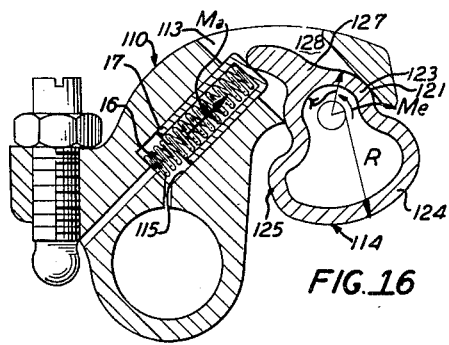
Figure 16 is a cross-sectional view of a second embodiment of the self-adjusting rocker arm mechanism taken substantially on the line 16—16 of Figure 17 looking in the direction of the arrows.

Referring now to Figs. 16 and 17, there is illustrated a further embodiment of the rocker arm. In the present embodiment the rocker arm, generally designated 110, is provided with a hub 111, a portion 113 for receiving an eccentric 114 of irregular configuration, and a bore 115 for the reception of helical spring 116 and a coaxially mounted piston 117 which transmits the force of the spring to the eccentric 114. In this embodiment the spring 17 acts upwardly against an upwardly extending extension 127 of eccentric 114, the extension 127 projecting into an opening above the bearing surface 121 engaged by the eccentric upper curved portion 123. One other distinction is that the eccentricity of the cam or eccentric 114 is reversed, as indicated by the point of origin of the radius R.

The effect of reversing the eccentricity of the cam or eccentric 114 and of reversing the area of contact between the plunger 17 and the cam or eccentric 114, is that the direction of the moments Ma and Me are reversed. This re-arrangement will, in effect, reverse the operation as previously described by interchanging the cam or eccentric roll and the cam or eccentric slip portions of the operating cycle. However, the function of the rocker arm as a lash compensating device and the basic method of obtaining this function is not altered.

Figure 18:
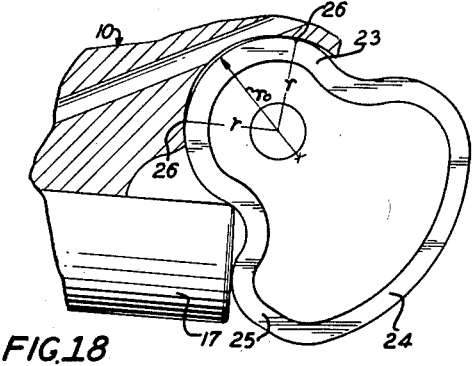
Figure 18 is a view in part similar to Figure 5 illustrating a further modification of the self-adjusting rocker arm mechanism.

Referring now to Fig. 18, there is illustrated a modification of the coacting portions of the rocker arm and eccentric. In order to ensure that the eccentric upper-curved portion 23 will seat properly within the curved bearing surface 21 regardless of variations in machining tolerances or discrepancies in machining which might in operation cause chatter, side play and other undesirable motions, it may be deemed desirable to make either the curved bearing surface 21 or the eccentric bearing surface an irregularly curved surface while the other surface remains a true radius. Therefore, rather than attempt to obtain true peripheral bearing contact between the respective bearing surfaces, the contact may be a tangential contact at pre-selected points. This may be accomplished by making the upper-curved portion 23 of the eccentric a curve comprised of segments of circles having radii $r$ and $r_o$, as shown in Fig. 18. The points of contact will be substantially at 26. Since the radii $r$ are shorter than the radius $r_o$, at no time will the top of the curve 23 engage the curve 21 to force the eccentric in a direction to disturb the engagement of the segments having the $r$ radii with the curve 21. It will be understood that the radius of the curve could be a true radius $r$ with the curve 21 comprising segments of circles having radii $r_o$ to obtain the same result.

It was stated earlier that one advantage to be derived from the structure embodying the present invention was that a proper frictional moment was generated through the curved bearing portion of the eccentric engaging the curved bearing surface of the rocker arm. It has been further discovered that the construction and arrangement described with reference to Fig. 18 provides a means for exactly controlling the frictional moment to provide the most efficient locking and rolling action of the eccentric in the rocker arm. In the arrangement illustrated in Figs. 1 to 6, in which the eccentric bearing surface and the rocker arm bearing surface are assumed to match each other, the load is assumed to act along the line $r$ (see Figs. 5 and 6). In the embodiment of Fig. 18, the load acts through both of the lines $r$ and $r$, that is divided and acts at the points of contact 26. The frictional force exerted by the load is a function of the including angle between the two lines $r$—$r$ and increases as a function of the secant of the included angle, reaching infinity at the position at which the two contact points would have an included angle of 180° therebetween.

It is thus readily apparent that the friction may be controlled so as to provide a minimum friction when the conditions are as illustrated in Figs. 1 to 6, inclusive, or some desired friction above the minimum by properly positioning the contact points 26 to give the optimum locking action.

It will be understood that the invention is not to be limited to the exact construction shown and described, but that various changes and modifications may be made without departing from the spirit and scope of the invention, as defined in the appended claims.

What is claimed is:

1. An internal combustion engine valve gear comprising, a rocker arm having a recessed curved bearing surface, an eccentric having a complementary curved surface engaging said curved bearing surface and a working face adapted to engage the stem of a spring loaded valve, biasing means engaging said rocker arm and said eccentric for producing a continuous unidirectional moment $Ma$ on said eccentric, the stem of the spring loaded valve, the center of said complementary curved surface, the center of rotation of said rocker arm, and the working face of said eccentric being located to generate a continuous unidirectional moment $Me$ tending to oppose the continuous unidirectional moment $Ma$ and being located to tend to cause said eccentric to rotate with respect to said rocker arm, during valve opening operations the tendency of said eccentric to rotate being in the same direction as the continuous constant moment $Ma$, the rotation of said eccentric being opposed by a frictional moment $Mc$ existing between the recessed curved bearing surface of said rocker arm and the complementary curved surface of said eccentric and a frictional moment $Mb$ existing between said eccentric and said biasing means, and being aided by a frictional moment $Md$ existing between the working face of said eccentric and the valve stem, the sum of the moments $Mb$, the frictional moment existing between said eccentric and said biasing means, plus $Mc$, the frictional moment existing between the recessed curved bearing surface of said rocker arm and the complementary curved surface of said eccentric, plus $Me$, the moment created by the force of the valve spring being greater than the sum of the moments $Ma$, the continuous unidirectional moment produced by the biasing means engaging said rocker arm and said eccentric, plus $Md$, the frictional moment existing between the working face of the eccentric and the valve stem, so that said eccentric freezes with respect to said rocker arm during valve opening operations, said eccentric tending to rotate in an opposite direction during valve closing operations thereby reversing the direction of the moment $Mb$, the frictional moment existing between said eccentric and said biasing means, the moment $Mc$, the frictional moment existing between the recessed curved bearing surface of said rocker arm and the complementary curved surface of said eccentric, and the moment $Md$, the frictional moment existing between the working face of the eccentric and the valve stem, the sum of the moments $Ma$, the constant continuous unidirectional moment produced by the biasing means engaging said rocker arm and said eccentric, plus $Mb$, the frictional moment existing between said eccentric and said biasing means, plus $Mc$, the frictional moment existing between the recessed curved bearing surface of said rocker arm and the complementary curved surface of said eccentric, being less than the sum of the moments $Md$, the frictional moment existing between the working face of the eccentric and the valve stem, plus $Me$, the moment created by the force of said valve spring, so that said eccentric rotates with respect to said rocker arm during valve closing operations thereby creating a lash between said eccentric and the valve stem when the valve is completely closed, the moment $Ma$, the continuous unidirectional moment produced by the biasing means engaging said rocker arm and said eccentric, being greater than the sum of the moments $Mb$, the frictional moment existing between said eccentric and said biasing means, plus $Mc$, the frictional moment existing between the recessed curved bearing surface of said rocker arm and the complementary curved surface of said eccentric, at the valve closed position so that said eccentric will rotate and take up the lash created.

2. An internal combustion engine valve gear comprising a rocker arm having a recessed curved bearing surface, an eccentric having a complementary curved surface engaging said curved bearing surface and a working face adapted to engage the stem of a spring loaded valve, spring means engaging said rocker arm, means connecting said complementary curved surface and said working face and engaging said spring means for producing a continuous constant unidirectional moment $Ma$ on said eccentric, the stem of the spring loaded valve, the center of said complementary curved surface, the center of rotation of said rocker arm, and the working face of said eccentric being located to generate a continuous unidirectional moment $Me$ tending to oppose the continuous constant unidirectional $Ma$, and being located to tend to cause said eccentric to rotate with respect to said rocker arm, during valve opening operations, the tendency of said eccentric to rotate being in the same direction as the continuous constant unidirectional moment $Ma$, the rotation of said eccentric being opposed by a frictional moment $Mc$ existing between the recessed curved bearing surface of said rocker arm and the complementary curved surface of said eccentric and a frictional moment $Mb$ existing between said eccentric and said spring means, and being aided by a frictional moment $Md$ existing between the working face of said eccentric and the valve stem, the sum of the moments $Mb$, the frictional moment existing between said eccentric and said spring means, plus $Mc$, the frictional moment existing between the recessed curved bearing surface of said rocker arm and the complementary curved surface of said eccentric, plus $Me$, the moment created by the force of said valve spring, being greater than the sum of the moments $Ma$, the constant continuous unidirectional moment produced by the spring means engaging said rocker arm and said eccentric, plus $Md$, the frictional moment existing between the working face of the eccentric and the valve stem, so that said eccentric freezes with respect to said rocker arm during valve opening operations, said eccentric tending to rotate in an opposite direction during valve closing operations thereby reversing the direction of the moment $Mb$, the frictional moment existing between said eccentric and said spring means, the moment $Mc$, the frictional moment existing between the recessed curved bearing surface of said rocker arm and the complementary curved surface of said eccentric, and the moment $Md$, the frictional moment existing between the working face of the eccentric and the valve stem, the sum of the moments $Ma$, the constant continuous unidirectional moment produced by the spring means engaging said rocker arm and said eccentric, plus $Mb$, the frictional moment existing between said eccentric and said spring means, plus $Mc$, the frictional moment existing between the recessed curved bearing surface of said rocker arm and the complementary curved surface of said eccentric, being less than the sum of the moments $Md$, the frictional moment existing between the working face of the eccentric and the valve stem, plus $Me$, the moment created by the force of said valve spring, so that said eccentric rotates with respect to said rocker arm during valve closing operations thereby creating a lash between said eccentric and the valve stem when the valve is completely closed, the moment $Ma$, the constant continuous unidirectional moment produced by the spring means engaging said rocker arm and said eccentric being greater than the sum of the moments $Mb$, the frictional moment existing between said eccentric and said spring means, plus $Mc$, the frictional moment existing between the recessed curved bearing surface of said rocker arm and the complementary curved surface of said eccentric, at the valve closed position so that said eccentric will rotate and take up the lash created.

3. An internal combustion engine valve gear comprising an aluminum alloy rocker arm having a recessed curved bearing surface, an eccentric having a complementary curved surface engaging said curved bearing surface and a working face adapted to engage the stem of a spring loaded valve, a helical spring having one end positioned against said rocker arm, a piston enclosing the other end of said spring and engaging said eccentric for rotationally biasing the eccentric with respect to said rocker arm, means connecting said complementary curved surface and the working face of said eccentric and engaging said piston for producing a continuous constant unidirectional moment $Ma$ on said eccentric, the stem of the spring loaded valve, the center of said complementary curved surface, the center of rotation of said rocker arm and the working face of said eccentric located to generate a continuous unidirectional moment $Me$ tending to oppose the continuous constant moment $Ma$, and being located to tend to cause said eccentric to rotate with respect to said rocker arm, during valve opening operations the tendency of said eccentric to rotate being in the same direction as the continuous constant moment $Ma$, the rotation of said eccentric being opposed by a frictional moment $Mc$, existing between the recessed curved bearing surface of said rocker arm and the complementing curved surface of said eccentric, a frictional moment $Mb$ existing between said eccentric and said piston and aided by a frictional moment $Md$ existing between the working face of said eccentric and the valve stem the sum of the moments $Mb$, the frictional moment existing between said eccentric and said piston, plus $Mc$, the frictional moment existing between the recessed curved bearing surface of said rocker arm and the complementary curved surface of said eccentric, plus $Me$, the moment created by the force of the valve spring, being greater than the sum of the moments $Ma$, the constant continuous unidirectional moment produced by said spring and piston, plus $Md$, the frictional moment existing between the working face of the eccentric and the valve stem, so that said eccentric freezes with respect to said rocker arm during valve opening operations, said eccentric tending to rotate in an opposite direction during valve closing operations thereby reversing the direction of the moment $Mb$, the frictional moment existing between said eccentric and said piston, the moment $Mc$, the frictional moment existing between the recessed curved bearing surface of said rocker arm and the complementary curved surface of said eccentric, and the moment $Md$, the frictional moment existing between the working face of the eccentric and the valve stem, the sum of the moments $Ma$, the constant continuous unidirectional moment produced by the spring and piston, plus $Mb$, the frictional moment existing between said eccentric and said piston, plus $Mc$, the frictional moment existing between the recessed curved bearing surface of said rocker arm and the complementary curved surface of said eccentric, being less than the sum of the moments $Md$, the frictional moment existing between the working face of the eccentric and the valve stem, plus $Me$, the moment created by the force of said valve spring, so that said eccentric rotates with respect to said rocker arm during valve closing operations thereby creating a lash between said eccentric and the valve stem when the valve is completely closed, the moment $Ma$, the constant unidirectional moment produced by the spring and piston, being greater than the sum of the moments $Mb$, the frictional moment existing between said eccentric and said piston, plus $Mc$, the frictional moment existing between the recessed curved bearing surface of said rocker arm and the complementary curved surface of said eccentric, at the valve closed position so that said eccentric will rotate and take up the lash created.

4. An internal combustion engine valve gear comprising a rocker arm composed of a metal selected from the group consisting of aluminum, magnesium, zinc and their alloys, said rocker arm having a curved bearing surface, an eccentric having a complementary curved surface engaging said curved bearing surface and a working face adapted to engage the stem of a spring loaded valve, biasing means engaging said rocker arm and said eccentric for producing a continuous unidirectional $Ma$ on said eccentric, the stem of the spring loaded valve, the center of said complementary curved surface, the center of rotation of said rocker arm, and the working face of said eccentric being located to generate a continuous unidirectional moment $Me$ tending to oppose the continuous constant moment $Ma$ and tending to cause said eccentric to rotate with respect to said rocker arm, during the valve opening operations the tendency of said eccentric to rotate being in the same direction as the continuous moment $Ma$, the rotation of said eccentric being opposed by a frictional moment $Mc$ existing between the recessed curved bearing surface of said rocker arm and the complementary curved surface of said eccentric and a frictional moment $Mb$ existing between said eccentric and said biasing means, and being aided by a frictional moment $Md$ existing between the working face of said eccentric and the valve stem, the sum of the moments $Mb$, the frictional moment existing between said eccentric and said biasing means, plus $Mc$, the frictional moment existing between the recessed curved bearing surface of said rocker arm and the complementary curved surface of said eccentric, plus $Me$, the moment created by the force of the valve spring, being greater than the sum of the moments $Ma$, the continuous unidirectional moment produced by the spring means engaging said rocker arm and said eccentric, plus $Md$, the frictional moment existing between the working face of the eccentric and the valve stem, so that said eccentric freezes with respect to said rocker arm during valve opening operations, said eccentric tending to rotate in an opposite direction during valve closing operations thereby reversing the direction of the moment $Mb$, the frictional moment existing between said eccentric and said biasing means, the moment $Mc$, the frictional moment existing between the recessed curved bearing surface of said rocker arm and the complementary curved surface of said eccentric, and the moment $Md$, the frictional moment existing between the working face of the eccentric and the valve stem, the sum of the moments $Ma$, the continuous unidirectional moment produced by the biasing means engaging said rocker arm and said eccentric, plus $Mb$, the frictional moment existing between said eccentric and said biasing means, plus $Mc$, the frictional moment existing between the recessed curved bearing surface of said rocker arm and the complementary curved surface of said eccentric, being less than the sum of the moments $Md$, the frictional moment existing between the working face of the eccentric and the valve stem, plus $Me$, the moment created by the force of said valve spring, so that said eccentric rotates with respect to said rocker arm during valve closing operations thereby creating a lash between said eccentric and the valve stem when the valve is completely closed, the moment $Ma$, the continuous unidirectional moment produced by the biasing means engaging said rocker arm and said eccentric, being greater than the sum of the moments $Mb$, the frictional moment existing between said eccentric and said biasing means, plus $Mc$, the frictional moment existing between the recessed curved bearing surface of said rocker arm and the complementary curved surface of said eccentric, at the valve closed position so that said eccentric will rotate and take up the lash created.

5. In a valve mechanism for an internal combustion engine a rocker arm composed of a metal selected from the group comprising aluminum, magnesium, zinc, and their alloys, said rocker arm having a curved bearing surface, an eccentric having a complementary curved surface engaging said curved bearing surface and a working face adapted to engage the stem of a spring loaded valve, said rocker arm having a bore positioned therein, a helical spring positioned in said bore, a piston positioned in said bore against one end of the helical spring and engaging said eccentric for producing a continuous unidirectional moment $Ma$ on said eccentric, means for permitting oil to fill said bore and to surround said spring thereby forming a dampening means for said helical spring, the stem of the spring loaded valve, the center of said complementary curved surface, the center of rotation of said rocker arm and the working face of said eccentric being located to generate a continuous unidirectional moment $Me$ tending to oppose the continuous unidirectional moment $Ma$, and being located to tend to cause said eccentric to rotate with respect to said rocker arm, during valve opening operations the tendency of said eccentric to rotate being in the same direction as the continuous unidirectional moment $Ma$, the rotation of said eccentric being opposed by a frictional moment $Mc$, existing between the curved bearing surface of said rocker arm and the complementary curved surface of said eccentric, a frictional moment $Mb$ existing between said eccentric and said piston and aided by a frictional moment $Md$ existing between the working face of said eccentric and the valve stem, the sum of the moments $Mb$, the frictional moment existing between said eccentric and said piston, plus $Mc$, the frictional moment existing between the curved bearing surface of said rocker arm and the complementary curved surface of said eccentric, plus $Me$, the moment created by the force of said valve spring, being greater than the sum of the moments $Ma$, the continuous unidirectional moment produced by said spring and piston, plus $Md$, the frictional moment existing between the working face of the eccentric and the valve stem, so that said eccentric freezes with respect to said rocker arm during valve opening operations, said eccentric tending to rotate in an opposite direction during valve closing operations thereby reversing the direction of the moment $Mb$, the frictional moment existing between said eccentric and said piston, the moment $Mc$, the frictional moment existing between the curved bearing surface of said rocker arm and the complementary curved surface of said eccentric, and the moment $Md$, the frictional moment existing between the working face of the eccentric and the valve stem, the sum of the moments $Ma$, the continuous unidirectional moment produced by the spring and piston, plus $Mb$, the frictional moment existing between said eccentric and said piston, plus $Mc$, the frictional moment existing between the curved bearing surface of said rocker arm and the complementary curved surface of said eccentric, being less than the sum of the moments $Md$, the frictional moment existing between the working face of the eccentric and the valve stem, plus $Me$, the moment created by the force of said valve spring, so that said eccentric rotates with respect to said rocker arm during valve closing operations thereby creating a lash between said eccentric and the valve stem when the valve is completely closed, the moment $Ma$, the continuous unidirectional moment produced by the spring and piston, being greater than the sum of the moments $Mb$, the frictional moment existing between the eccentric and said piston, plus $Mc$, the frictional moment existing between the recessed curved bearing surface of said rocker arm and the complementary curved surface of said eccentric, at the valve closed position so that said eccentric will rotate and take up the lash created.

6. In a valve mechanism for an internal combustion engine, a rocker arm adapted for oscillatory motion about a center of oscillation and adapted to operate a spring loaded valve, said rocker arm having an arcuate shaped recessed portion, an eccentric having a complementary arcuate shaped portion engaging the arcuate shaped recessed portion of said rocker arm and adapted to rotate with respect thereto, thereby generating a frictional moment acting on said eccentric caused by friction between said eccentric and said rocker arm, said eccentric also having a working face adapted to engage the spring loaded valve and to move with respect thereto thereby generating a frictional moment acting on said eccentric caused by friction between said working face and said valve, spring means engaging said rocker arm and said eccentric for generating a continuous unidirectional moment on said eccentric tending to rotate the working face of said eccentric away from the center of oscillation of said rocker arm, a frictional force being created between said eccentric and said spring means which generates a frictional moment acting on said eccentric when the eccentric rotates with respect to the spring means, the line of action of the spring loaded valve being offset from the center of the arcuate shaped portion of said rocker arm and the complementary arcuate shaped portion of said eccentric toward the center of oscillation of said rocker arm for generating a moment on said eccentric acting to rotate the working face of said eccentric toward the center of oscillation of said rocker arm as said eccentric acts to open and close the spring loaded valve, the working face of said eccentric tending to rotate away from the center of oscillation of said rocker arm while the valve is open thereby causing the frictional moment between the arcuate shaped recessed portion of the rocker arm and the complementary arcuate portion of the eccentric and the frictional moment between the eccentric and the spring means to act in a direction to resist the tendency of the working face of the eccentric to rotate away from said center of oscillation of said rocker arm while the frictional force between the working face of the eccentric and the spring loaded valve acts to generate a moment tending to rotate the working face of said eccentric away from the center of oscillation of said rocker arm, the sum of the moments acting to rotate the working face of said eccentric toward the center of oscillation of said rocker arm being greater than the sum of the moments acting to rotate said working face of the eccentric away from the center of oscillation of said rocker arm whereby the eccentric freezes in said rocker arm and said working face of said eccentric moves across said valve during the valve opening portion of the operating cycle, the working face of said eccentric tending to rotate toward the center of oscillation of said rocker arm during valve closing operations thereby reversing the directions of the moment caused by friction between the arcuate shaped recessed portion of the rocker arm and the complementary arcuate shaped portion of the eccentric, of the moment caused by friction between the eccentric and the spring means, and of the moment caused by friction between the working face of said eccentric and said spring loaded valve, the sum of the moments acting to rotate the working face of the eccentric toward the center of oscillation of said rocker arm being greater than the sum of the moments acting to rotate the working face of said eccentric away from the center of oscillation of said rocker arm whereby the working face of said eccentric is rotated toward the center of oscillation of said rocker arm and the working face rolls on said valve, the working face of said eccentric moving across the valve for a greater distance during the valve opening portion of the operating cycle then it rolls back during the valve closing portion of the operating cycle thereby creating a lash between the working face of the eccentric and the valve when the valve is closed and the rocker arm has reached the limit of its travel, said spring means engaging said rocker arm and said eccentric rotating the working face of the eccentric away from the center of oscillation of said rocker arm so that said working face contacts said valve and said lash is eliminated.

7. In a valve mechanism for an internal combustion engine, an aluminum alloy rocker arm adapted for oscillatory motion about a center of oscillation and adapted to operate a spring loaded valve, said rocker arm having an arcuate shaped recessed portion, an eccentric having a complementary arcuate shaped portion engaging the arcuate shaped recessed portion of said rocker arm and adapted to rotate with respect thereto, thereby generating a frictional moment acting on said eccentric caused by friction between said eccentric and said rocker arm, said eccentric having a working face adapted to engage the spring loaded valve and to move with respect thereto thereby generating a frictional moment acting on said eccentric caused by friction between said working face and said valve, spring means engaging said rocker arm, said eccentric also comprising means connecting the complementary arcuate shaped portion and the working face and engaging said spring means for varying the moment arm of said spring means inversely to the magnitude of the force exerted on said eccentric by said spring means thereby generating a constant continuous unidirectional moment on said eccentric tending to rotate the working face of said eccentric away from the center of oscillation of said rocker arm, a frictional force being created between said eccentric and said spring means which generates a frictional moment acting on said eccentric when the eccentric rotates with respect to the spring means, the line of action of the spring loaded valve being offset from the center of the arcuate shaped portion of said rocker arm and the complementary arcuate shaped portion of said eccentric toward the center of oscillation of said rocker arm for generating a moment on said eccentric acting to rotate the working face of said eccentric toward the center of oscillation of said rocker arm as said eccentric acts to open and close the spring loaded valve, the working face of said eccentric tending to rotate away from the center of oscillation of said rocker arm while the valve is opening thereby causing the frictional moment between the arcuate shaped recessed portion of the rocker arm and the complementary arcuate portion of the eccentric and the frictional moment between the eccentric and the spring means to act in a direction to resist the tendency of the working face of the eccentric to rotate away from said center of oscillation of said rocker arm while the frictional force between the working face of the eccentric and the spring loaded valve acts to generate a moment tending to rotate the working face of said eccentric away from the center of oscillation of said rocker arm, the sum of the moments acting to rotate the working face of said eccentric toward the center of oscillation of said rocker arm being greater than the sum of the moments acting to rotate said working face of the eccentric away from the center of oscillation of said rocker arm whereby the eccentric freezes in said rocker arm and said working face of said eccentric moves across said valve during the valve opening portion of the operating cycle, the working face of said eccentric tending to rotate toward the center of oscillation of said rocker arm during valve closing operations thereby reversing the directions of the moment caused by friction between the arcuate shaped recessed portion of the rocker arm and the complementary arcuate shaped portion of the eccentric of the moment caused by friction between the eccentric and the spring means, and of the moment caused by friction between the working face of said eccentric and said spring loaded valve, the sum of the moments acting to rotate the working face of the eccentric toward the center of oscillation of said rocker arm being greater than the sum of the moments acting to rotate the working face of said eccentric away from the center of oscillation of said rocker arm whereby the working face of said eccentric is rotated toward the center of oscillation of said rocker arm and the working face rolls on said valve, the working face of said eccentric moving across the valve for a greater distance during the valve opening portion of the operating cycle then it rolls back during the valve closing portion of the operating cycle thereby creating a lash between the working face of the eccentric and the valve when the valve is closed and the rocker arm has reached the limit of its travel, said spring means engaging said rocker arm and said eccentric rotating the working face of the eccentric away from the center of oscillation of said rocker arm so that said working face contacts said valve and said lash is eliminated.

8. In a valve mechanism for an internal combustion engine, a rocker arm composed of a metal selected from the group comprising aluminum, magnesium, zinc and their alloys adapted for oscillatory motion about a center of oscillation and adapted to operate a spring loaded valve, said rocker arm having a recessed bearing surface in the form of a cylindrical segment, an eccentric having a complementary cylindrical portion engaging said cylindrical bearing surface of said rocker arm and adapted to rotate with respect thereto thereby generating a frictional moment acting on said eccentric caused by friction between said eccentric and said rocker arm, said eccentric having a working face adapted to engage the spring loaded valve and to move with respect thereto thereby generating a frictional moment acting on said eccentric caused by friction between said working face and said valve, said rocker arm having a bore positioned therein, a helical spring positioned in said bore, a piston positioned in said bore engaging one end of said spring, said eccentric also comprising means connecting the complementary cylindrical portion and the working face and engaging said piston for varying the moment arm of said helical spring inversely to the magnitude of the force exerted on said eccentric by said helical spring thereby generating a constant continuous unidirectional moment on said eccentric tending to rotate the working face of said eccentric away from the center of oscillation of said rocker arm, means for permitting oil to fill said bore, surround said spring and exert force on said piston thereby forming a dampening means for said helical spring, a frictional force being created between said eccentric and said piston which generates a frictional moment acting on said eccentric when the eccentric rotates with respect to the helical spring and piston, the line of action of the spring loaded valve being offset from the center of the cylindrical portion of said rocker arm and the complementary cylindrical portion of said eccentric toward the center of oscillation of said rocker arm for generating a moment on said eccentric acting to rotate the working face of said eccentric toward the center of oscillation of said rocker arm as said eccentric acts to open and close the spring loaded valve, the working face of said eccentric tending to rotate away from the center of oscillation of said rocker arm while the valve is opening thereby causing the frictional moment between the cylindrical recessed portion of the rocker arm and the complementary cylindrical portion of the eccentric and the frictional moment between the eccentric and the piston to act in a direction to resist the tendency of the working face of the eccentric to rotate away from said center of oscillation of said rocker arm while the frictional force between the working face of the eccentric and the spring loaded valve acts to generate a moment tending to rotate the working face of said eccentric away from the center of oscillation of said rocker arm, the sum of the moments acting to rotate the working face of said eccentric toward the center of oscillation of said rocker arm being greater than the sum of the moments acting to rotate said working face of the eccentric away from the center of oscillation of said rocker arm whereby the eccentric freezes in said rocker arm and said working face of said eccentric moves across said valve during the valve opening portion of the operating cycle, the working face of said eccentric tending to rotate toward the center of oscillation of said rocker arm during valve closing operations thereby reversing the direction of the moment caused by friction between the cylindrical recessed portion of the rocker arm and the complementary cylindrical portion of the eccentric, of the moment caused by friction between the eccentric and the piston, and of the moment caused by friction between the working face of said eccentric and said spring loaded valve, the sum of the moments acting to rotate the working face of the eccentric toward the center of oscillation of said rocker arm being greater than the sum of the moments acting to rotate the working face of said eccentric away from the center of oscillation of said rocker arm whereby the working face of said eccentric is rotated toward the center of oscillation of said rocker arm and the working face rolls on said valve, the working face of said eccentric moving across the valve for a greater distance during the valve opening portion of the operating cycle then it rolls back during the valve closing portion of the operating cycle thereby creating a lash between the working face of the eccentric and the valve when the valve is closed and the rocker arm has reached the limit of its travel, said helical spring rotating the working face of the eccentric away from the center of oscillation of said rocker arm so that said working face contacts said valve and said lash is eliminated.

9. In a valve mechanism for an internal combustion engine, a rocker arm adapted for oscillatory motion about a center of oscillation and adapted to operate a spring loaded valve, said rocker arm having an arcuate shaped portion, an eccentric also having an arcuate shaped portion, one of said portions being in the form of a recess to cooperatively receive the other of said portions therewithin, said eccentric being adapted to rotate with respect to said rocker arm portion about a predetermined center of rotation, thereby generating a frictional moment acting on said eccentric caused by friction between said cooperative portions of said eccentric and said rocker arm, said eccentric also having a working face adapted to engage the spring loaded valve and to move with respect thereto thereby generating a frictional moment acting on said eccentric caused by friction between said working face and said valve, spring means engaging said rocker arm and said eccentric for generating a continuous unidirectional moment on said eccentric tending to rotate the working face of said eccentric in one direction with respect to the center of oscillation of said rocker arm, a frictional force being created between said eccentric and said spring means which generates a frictional moment acting on said eccentric when the latter rotates with respect to the spring means, the line of action of the spring loaded valve being offset from said pre-determined center of rotation of said eccentric with respect to the center of oscillation of said rocker arm for generating a moment on said eccentric acting to rotate the working face of said eccentric in an opposite direction with respect to the center of oscillation of said rocker arm as said ececntric acts to move the spring loaded valve through its opening and closing cycle, the working face of said eccentric tending to rotate in said one direction with respect to the center of oscillation of said rocker arm during part of said cycle thereby causing the frictional moment between the cooperative arcuate shaped portion of the rocker arm and the arcuate shaped portion of the eccentric and the frictional moment between the eccentric and the spring means to act in a direction to resist the tendency of the working face of the eccentric to rotate in said one direction with respect to said center of oscillation of said rocker arm while the frictional force between the working face of the eccentric and the spring loaded valve acts to generate a moment tending to rotate the working face of said eccentric in said one direction with respect to the center of oscillation of said rocker arm, the sum of the moments acting to rotate the working face of said eccentric in the opposite direction with respect to the center of oscillation of said rocker arm being greater than the sum of the moments acting to rotate said working face of the eccentric in said one direction with respect to the center of oscillation of said rocker arm whereby said eccentric freezes in said rocker arm and said working face of said eccentric moves across said valve during a part of the operating cycle, the working face of said eccentric tending to rotate in said opposite direction with respect to the center of oscillation of said rocker arm during a further part of the operating cycle thereby reversing the directions of the moment caused by friction between the cooperative arcuate shaped portions of the rocker arm and eccentric, of the moment caused by friction between the eccentric and spring means, and of the moment caused by friction between the working face of said eccentric and said spring loaded valve, the sum of the moments acting to rotate the working face of the eccentric in said opposite direction with respect to the center of oscillation of said rocker arm being greater than the sum of the moments acting to rotate the working face of said eccentric in said one direction with respect to the center of oscillation of said rocker arm whereby the working face of said eccentric is rotated in said opposite direction with respect to the center of oscillation of said rocker arm and the working face rolls on said valve, the working face of said eccentric moving across the valve in said one direction for a greater distance than it rolls in said opposite direction during the respective portions of the operating cycle thereby creating a lift differential between the starting and ending positions of the valve and rocker arm during a complete operating cycle, said spring means engaging said rocker arm and said eccentric rotating the working face of the eccentric in said one direction with respect to the center of oscillation of said rocker arm whenever said lift differential results in a lift loss so that said working face contacts said valve and said lift loss is eliminated.

10. In a valve mechanism for an internal combustion engine, a rocker arm adapted for oscillatory motion about a center of oscillation and adapted to operate a spring loaded valve, said rocker arm having an arcuate shaped portion, an eccentric also having an arcuate shaped portion, one of said portions being in the form of a recess to cooperatively receive the other of said portions therewithin, said eccentric being adapted to rotate with respect to said rocker arm portion about a predetermined center of rotation, thereby generating a frictional moment acting on said eccentric caused by friction between said cooperative portions of said eccentric and said rocker arm, said eccentric also having a working face adapted to engage the spring loaded valve and to move with respect thereto thereby generating a frictional moment acting on said eccentric caused by friction between said working face and said valve, spring means engaging said rocker arm and said eccentric for generating a continuous unidirectional moment on said eccentric tending to rotate the working face of said eccentric in one direction with respect to the center of oscillation of said rocker arm, a frictional force being created between said eccentric and said spring means which generates a frictional moment acting on said eccentric when the latter rotates with respect to the spring means, the line of action of the spring loaded valve being offset from said pre-determined center of rotation of said eccentric with respect to the center of oscillation of said rocker arm for generating a moment on said eccentric acting to rotate the working face of said eccentric in an opposite direction with respect to the center of oscillation of said rocker arm as said eccentric acts to move the spring loaded valve through its opening and closing cycle, said one direction being away from and said opposite direction being toward said center of oscillation of said rocker arm when said line of action lies between said center of oscillation and said pre-determined center of rotation and said one direction being toward and said opposite direction being away from said center of oscillation when said line of action lies outwardly of said pre-determined center of rotation, the working face of said eccentric tending to rotate in said one direction with respect to the center of oscillation of said rocker arm during part of said cycle thereby causing the frictional moment between the cooperative arcuate shaped portion of the rocker arm and the arcuate shaped portion of the eccentric and the frictional moment between the eccentric and the spring means to act in a direction to resist the tendency of the working face of the eccentric to rotate in said one direction with respect to said center of oscillation of said rocker arm while the frictional force between the working face of the eccentric and the spring loaded valve acts to generate a moment tending to rotate the working face of said eccentric in said one direction with respect to the center of oscillation of said rocker arm, the sum of the moments acting to rotate the working face of said eccentric in the opposite direction with respect to the center of oscillation of said rocker arm being greater than the sum of the moments acting to rotate said working face of the eccentric in said one direction with respect to the center of oscillation of said rocker arm whereby said eccentric freezes in said rocker arm and said working face of said eccentric moves across said valve during a part of the operating cycle, the working face of said eccentric tending to rotate in said opposite direction with respect to the center of oscillation of said rocker arm during a further part of the operating cycle thereby reversing the directions of the moment caused by friction between the cooperative arcuate shaped portions of the rocker arm and eccentric, of the moment caused by friction between the eccentric and spring means, and of the moment caused by friction between the working face of said eccentric and said spring loaded valve, the sum of the moments acting to rotate the working face of the eccentric in said opposite direction with respect to the center of oscillation of said rocker arm being greater than the sum of the moments acting to rotate the working face of said eccentric in said one direction with respect to the center of oscillation of said rocker arm whereby the working face of said eccentric is rotated in said opposite direction with respect to the center of oscillation of said rocker arm and the working face rolls on said valve, the working face of said eccentric moving across the valve in said one direction for a greater distance than it rolls in said opposite direction during the respective portions of the operating cycle thereby creating a lift differential between the starting and ending positions of the valve and rocker arm during a complete operating cycle, said spring means engaging said rocker arm and said eccentric rotating the working face of the eccentric in said one direction with respect to the center of oscillation of said rocker arm whenever said lift differential results in a lift loss so that said working face contacts said valve and said lift loss is eliminated.

11. In a valve mechanism for an internal combustion engine, a rocker arm adapted for oscillatory motion about a center of oscillation and adapted to operate a spring loaded valve, said rocker arm having an arcuate shaped portion, an eccentric also having an arcuate shaped portion, one of said portions being recessed to receive the other of said portions therewithin and adapted to rotate with respect thereto about a pre-determined center of rotation, thereby generating a frictional moment acting on said eccentric caused by friction between said eccentric and said rocker arm, said ececntric also having a working face adapted to engage the spring loaded valve and to move with respect thereto thereby generating a frictional moment acting on said eccentric caused by friction between said working face and said valve, spring means engaging said rocker arm and said eccentric for generating a continuous unidirectional moment on said eccentric tending to rotate the working face of said eccentric away from the center of oscillation of said rocker arm, a frictional force being created between said eccentric and said spring means which generates a frictional moment acting on said eccentric when the latter rotates with respect to the spring means, the line of action of the spring loaded valve being offset from said pre-determined center of rotation of said eccentric toward the center of oscillation of said rocker arm for generating a moment on said eccentric acting to rotate the working face of said eccentric toward the center of oscillation of said rocker arm as said eccentric acts to move the spring loaded valve through its opening and closing cycle, the working face of said eccentric tending to rotate away from the center of oscillation of said rocker arm during the portion of said cycle in which the projection of said pre-determined center of rotation on an ordinate through said center of oscillation moves away from said center of oscillation thereby causing the frictional moment between the arcuate shaped portion of the rocker arm and the arcuate shaped portion of the eccentric and the frictional moment between the eccentric and the spring means to act in a direction to resist the tendency of the working face of the eccentric to rotate away from said center of oscillation of said rocker arm while the frictional force between the working face of the eccentric and the spring loaded valve acts to generate a moment tending to rotate the working face of said eccentric away from the center of oscillation of said rocker arm, the sum of the moments acting to rotate the working face of said eccentric toward the center of oscillation of said rocker arm being greater than the sum of the moments acting to rotate said working face of the eccentric away from the center of oscillation of said rocker arm whereby said essentric freezes in said rocker arm and said working face of said eccentric moves across said valve during said portion of the operating cycle, the working face of said eccentric tending to rotate toward the center of oscillation of said rocker arm during a further portion of the operating cycle in which said projection of said pre-determined center of rotation moves along said ordinate toward said center of oscillation thereby reversing the direction of the moment caused by friction between the arcuate shaped portions of the rocker arm and eccentric, of the moment caused by friction between the eccentric and spring means, and of the moment caused by friction between the working face of said eccentric and said spring loaded valve, the sum of the moments acting to rotate the working face of the eccentric toward the center of oscillation of said rocker arm being greater than the sum of the moments acting to rotate the working face of said eccentric away from the center of oscillation of said rocker arm whereby the working face of said eccentric is rotated toward the center of oscillation of said rocker arm and the working face rolls on said valve, the working face of said eccentric moving across the valve for a greater distance when the projection of said pre-determined center of rotation on said ordinate is moving away from said center of oscillation then it rolls in the opposite direction during the respective portions of the operating cycle thereby creating a lift differential between the starting and ending positions of the valve and rocker arm during a complete operating cycle, said spring means engaging said rocker arm and said eccentric rotating the working face of the eccentric away from the center of oscillation of said rocker arm whenever said lift differential results in a lift loss so that said working face contacts said valve and said lift loss is eliminated.

12. In a valve mechanism for an internal combustion engine, a rocker arm adapted for oscillatory motion about a center of oscillation and adapted to operate a spring loaded valve, said rocker arm having an arcuate shaped portion, an eccentric also having an arcuate shaped portion, one of said portions being recessed to receive the other of said portions therewithin and adapted to rotate with respect thereto about a pre-determined center of rotation, thereby generating a frictional moment acting on said eccentric caused by friction between said eccentric and said rocker arm, said eccentric also having a working face adapted to engage the spring loaded valve and to move with respect thereto thereby generating a frictional moment acting on said eccentric caused by friction between said working face and said valve, spring means engaging said rocker arm and said eccentric for generating a continuous unidirectional moment on said eccentric tending to rotate the working face of said eccentric away from the center of oscillation of said rocker arm, a frictional force being created between said eccentric and said spring means which generates a frictional moment acting on said eccentric when the latter rotates with respect to the spring means, the line of action of the spring loaded valve being offset from said pre-determined center of rotation of said eccentric toward the center of oscillation of said rocker arm for generating a moment on said eccentric acting to rotate the working face of said eccentric toward the center of oscillation of said rocker arm as said eccentric acts to move the spring loaded valve through its opening and closing cycle, the working face of said eccentric tending to rotate away from the center of oscillation of said rocker arm during the portion of said cycle in which said rocker arm has a first quadrant clockwise rotation thereby causing the frictional moment between the arcuate shaped portion of the rocker arm and the arcuate shaped portion of the eccentric and the frictional moment between the eccentric and the spring means to act in a direction to resist the tendency of the working face of the eccentric to rotate away from said center of oscillation of said rocker arm while the frictional force between the working face of the eccentric and the spring loaded valve acts to generate a moment tending to rotate the working face of said eccentric away from the center of oscillation of said rocker arm, the sum of the moments acting to rotate the working face of said ececntric toward the center of oscillation of said rocker arm being greater than the sum of the moments acting to rotate said working face of the eccentric away from the center of oscillation of said rocker arm whereby said eccentric freezes in said rocker arm and said working face of said eccentric moves across said valve during said portion of the operating cycle, the working face of said eccentric tending to rotate toward the center of oscillation of said rocker arm during a further portion of the operating cycle in which said rocker arm has a first quadrant counterclockwise rotation thereby reversing the direction of the moment caused by friction between the arcuate shaped portions of the rocker arm and eccentric, of the moment caused by friction between the eccentric and spring means, and of the moment caused by friction between the working face of said eccentric and said spring loaded valve, the sum of the moments acting to rotate the working face of the eccentric toward the center of oscillation of said rocker arm being greater than the sum of the moments acting to rotate the working face of said eccentric away from the center of oscillation of said rocker arm whereby the working face of said eccentric is rotated toward the center of oscillation of said rocker arm and the working face rolls on said valve, the working face of said eccentric moving across the valve for a greater distance than it rolls back during the respective portions of the operating cycle thereby creating a lash between the starting and ending positions of the valve and rocker arm during a complete operating cycle, said spring means engaging said rocker arm and said eccentric rotating the working face of the eccentric away from the center of oscillation of said rocker arm so that said working face contacts said valve and said lash is eliminated.

13. An internal combustion engine valve gear comprising a rocker arm having a positioning surface thereon, an eccentric having a portion engaging said positioning surface and rotatable with respect thereto about a pre-determined center, said eccentric having a working face adapted to engage the stem of a spring loaded valve, biasing means interposed between said rocker arm and said eccentric for producing a continuous unidirectional moment $Ma$ on said eccentric, the stem of the spring loaded valve, the pre-determined center of rotation of said eccentric portion, the center of rotation of said rocker arm, and the working face of said eccentric being located to generate a continuous unidirectional moment $Me$ tending to oppose the continuous unidirectional moment $Ma$ and being located to tend to cause said eccentric to rotate with respect to said rocker arm, during movement of the point of contact between said working face and stem away from the center of rotation of said rocker arm the tendency of said eccentric to rotate being in the same direction as the continuous moment $Ma$, the rotation of said eccentric being opposed by a frictional moment $Mc$ existing between the positioning surface of said rocker arm and the eccentric portion engaged therewith and a frictional moment $Mb$ existing between said eccentric and said biasing means, and being aided by a frictional moment $Md$ existing between the working face of said eccentric and the valve stem, the sum of the moments $Mb$, the frictional moment existing between said eccentric and said biasing means, plus $Mc$, the frictional moment existing between the positioning surface of said rocker arm and the eccentric portion engaged therewith, plus $Me$, the moment created by the force of the valve spring being greater than the sum of the moments $Ma$, the continuous unidirectional moment produced by said biasing means, plus $Md$, the frictional moment existing between the working face of the eccentric and the valve stem, so that said eccentric freezes with respect to said rocker arm during movement of the point of contact between said working face and stem away from the center of rotation of said rocker arm, said eccentric tending to rotate in an opposite direction during movement of the point of contact between said working face and stem toward the center of rotation of said rocker arm thereby reversing the direction of the moment $Mb$, the frictional moment existing between said eccentric and said biasing means, the moment $Mc$, the frictional moment existing between the positioning surface of said rocker arm and the eccentric portion engaged therewith, and the moment $Md$, the frictional moment existing between the working face of the eccentric and the valve stem, the sum of the moments $Ma$, the constant continuous unidirectional moment produced by said biasing means, plus $Mb$, the frictional moment existing between said eccentric and said biasing means, plus $Mc$, the frictional moment existing between the positioning surface of said rocker arm and the eccentric portion engaged therewith, being less than the sum of the moment $Md$, the frictional moment existing between the working face of the eccentric and the valve stem, plus $Me$, the moment created by the force of said valve spring, so that said eccentric rotates with respect to said rocker arm during movement of the point of contact between said working face and stem toward the center of rotation of said rocker arm thereby creating a lift differential between said eccentric and the valve stem when said valve has completed a movement cycle, the moment $Ma$, the continuous unidirectional movement produced by said biasing means, being greater than the sum of the moments $Mb$, the frictional moment existing between said eccentric and said biasing means, plus $Mc$, the frictional moment existing between the positioning surface of said rocker arm and the eccentric portion engaged therewith, at the end of said valve cycle so that said eccentric will rotate and take up the lift differential whenever a lift loss results from movement of said point of contact.

14. An internal combustion engine valve gear comprising a rocker arm having a positioning surface thereon, an eccentric having a portion engaging said positioning surface and rotatable with respect thereto about a pre-determined center, said eccentric having a working face adapted to engage the stem of a spring loaded valve, biasing means interposed between said rocker arm and said eccentric for producing a continuous unidirectional moment $Ma$ on said eccentric, the stem of the spring loaded valve, the pre-determined center of rotation of said eccentric portion, the center of rotation of said rocker arm, and the working face of said eccentric being located to generate a continuous unidirectional moment $Me$ tending to oppose the continuous unidirectional moment $Ma$ and being located to tend to cause said eccentric to rotate with respect to said rocker arm, during movement of the point of contact between said working face and stem in a first direction with respect to the center of rotation of said rocker arm the tendency of said eccentric to rotate being in the same direction as the continuous moment $Ma$, the rotation of said eccentric being opposed by a frictional moment $Mc$ existing between the positioning surface of said rocker arm and the eccentric portion engaged therewith and a frictional moment $Mb$ existing between said eccentric and said biasing means, and being aided by a frictional moment $Md$ existing between the working face of said eccentric and the valve stem, the frictional moment existing between said eccentric and said biasing means, plus $Mc$, the frictional moment existing between the positioning surface of said rocker arm and the eccentric portion engaged therewith, plus $Me$, the moment created by the force of the valve spring being greater than the sum of the moments $Ma$, the continuous unidirectional moment produced by said biasing means, plus $Md$, the frictional moment existing between the working face of the eccentric and the valve stem, so that said eccentric freezes with respect to said rocker arm during movement of the point of contact between said working face and stem in said first direction with respect to the center of rotation of said rocker arm, said eccentric tending to rotate in an opposite direction during movement of the point of contact between said working face and stem in a second direction opposite to said first direction with respect to the center of rotation of said rocker arm thereby reversing the direction of the moment $Mb$, the frictional moment existing between said eccentric and said biasing means, the moment $Mc$, the frictional moment existing between the positioning surface of said rocker arm and the eccentric portion engaged therewith, and the moment $Md$, the frictional moment existing between the working face of the eccentric and the valve stem, the sum of the moments $Ma$, the constant continuous unidirectional moment produced by said biasing means, plus $Mb$, the frictional moment existing between said eccentric and said biasing means, plus $Mc$, the frictional moment existing between the positioning surface of said rocker arm and the eccentric portion engaged therewith, being less than the sum of the moment $Md$, the frictional moment existing between the working face of the eccentric and the valve stem, plus $Me$, the moment created by the force of said valve spring, so that said eccentric rotates with respect to said rocker arm during movement of the point of contact between said working face and stem in said second direction with respect to the center of rotation of said rocker arm thereby creating a lift differential between said eccentric and the valve stem when said valve has completed a movement cycle, the moment $Ma$, the continuous unidirectional movement produced by said biasing means, being greater than the sum of the moments $Mb$, the frictional moment existing between said eccentric and said biasing means, plus $Mc$, the frictional moment existing between the positioning surface of said rocker arm and the eccentric portion engaged therewith, at the end of said valve cycle so that said eccentric will rotate and take up the lift differential whenever a lift loss results from movement of said point of contact.

15. An internal combustion engine valve gear comprising a rocker arm having a positioning surface thereon, an eccentric having a portion engaging said positioning surface and rotatable with respect thereto about a pre-determined center, said eccentric having a working face adapted to engage the stem of a spring loaded valve, biasing means interposed between said rocker arm and said eccentric for producing a continuous unidirectional moment $Ma$ on said eccentric, the stem of the spring loaded valve, the pre-determined center of rotation of said eccentric portion, the center of rotation of said rocker arm, and the working face of said eccentric being located to generate a continuous unidirectional moment $Me$ tending to oppose the continuous unidirectional moment $Ma$ and being located to tend to cause said eccentric to rotate with respect to said rocker arm, during movement of the point of contact between said working face and stem in a first direction with respect to the center of rotation of said rocker arm the tendency of said eccentric to rotate being in the same direction as the continuous moment $Ma$, the rotation of said eccentric being opposed by a frictional moment $Mc$ existing between the positioning surface of said rocker arm and the eccentric portion engaged therewith and a frictional moment $Mb$ existing between said eccentric and said biasing means, and being aided by a frictional moment $Md$ existing between the working face of said eccentric and the valve stem, the frictional moment existing between said eccentric and said biasing means, plus $Mc$, the frictional moment existing between the positioning surface of said rocker arm and the eccentric portion engaged therewith, plus $Me$, the moment created by the force of the valve spring being greater than the sum of the moments $Ma$, the continuous unidirectional moment produced by said biasing means, plus $Md$, the frictional moment existing between the working face of the eccentric and the valve stem, so that said eccentric freezes with respect to said rocker arm during movement of the point of contact between said working face and stem in said first direction with respect to the center of rotation of said rocker arm, said eccentric tending to rotate in an opposite direction during movement of the point of contact between said working face and stem in a second direction opposite to said first direction with respect to the center of rotation of said rocker arm thereby reversing the direction of the moment $Mb$, the frictional moment existing between said eccentric and said biasing means, the moment $Mc$, the frictional moment existing between the positioning surface of said rocker arm and the eccentric portion engaged therewith, and the moment $Md$, the frictional moment existing between the working face of the eccentric and the valve stem, the sum of the moments $Ma$, the constant continuous unidirectional moment produced by said biasing means, plus $Mb$, the frictional moment existing between said eccentric and said biasing means, plus $Mc$, the frictional moment existing between the positioning surface of said rocker arm and the eccentric portion engaged therewith, being less than the sum of the moment $Md$, the frictional moment existing between the working face of the eccentric and the valve stem, plus $Me$, the moment created by the force of said valve spring, so that said eccentric rotates with respect to said rocker arm during movement of the point of contact between said working face and stem in said second direction with respect to the center of rotation of said rocker arm thereby creating a lift differential between said eccentric and the valve stem when said valve has completed a movement cycle, said first direction being away from and said second direction being toward said center of rotation of said rocker arm when said continuous unidirectional moment $Me$ acts between the center of rotation of the rocker arm and the pre-determined center of rotation of the eccentric and said first direction being toward and said second direction being away from said center of rotation when said unidirectional moment $Me$ acts outwardly of said pre-determined center of rotation, the moment $Ma$, the continuous unidirectional movement produced by said biasing means, being greater than the sum of the moments $Mb$, the frictional moment existing between said eccentric and said biasing means, plus $Mc$, the frictional moment existing between the positioning surface of said rocker arm and the eccentric portion engaged therewith, at the end of said valve cycle so that said eccentric will rotate and take up the lift differential whenever a lift loss results from movement of said point of contact.

16. An internal combustion engine valve gear comprising a rocker arm having a positioning surface thereon, an eccentric having a portion engaging said positioning surface and rotatable with respect thereto about a pre-determined center, said eccentric having a working face adapted to engage the stem of a spring loaded valve, biasing means interposed between said rocker arm and said eccentric for producing a continuous unidirectional moment $Ma$ on said eccentric, the stem of the spring loaded valve, the pre-determined center of rotation of said eccentric portion, the center of rotation of said rocker arm, and the working face of said eccentric being located to generate a continuous unidirectional moment $Me$ tending to oppose the continuous unidirectional moment $Ma$ and being located to tend to cause said eccentric to rotate with respect to said rocker arm, during the portion of the valve operating cycle in which said rocker arm has a first quadrant clockwise rotation the tendency of said eccentric to rotate being in the same direction as the continuous moment $Ma$, the rotation of said eccentric being opposed by a frictional moment $Mc$ existing between the positioning surface of said rocker arm and the eccentric portion engaged therewith and a frictional moment $Mb$ existing between said eccentric and said biasing means, and being aided by a frictional moment $Md$ existing between the working face of said eccentric and the valve stem, the frictional moment existing between said eccentric and said biasing means, plus $Mc$, the frictional moment existing between the positioning surface of said rocker arm and the eccentric portion engaged therewith, plus $Me$, the moment created by the force of the valve spring being greater than the sum of the moments $Ma$, the continuous unidirectional moment produced by said biasing means, plus $Md$, the frictional moment existing between the working face of the eccentric and the valve stem, so that said eccentric freezes with respect to said rocker arm during said rocker arm first quadrant clockwise rotation, said eccentric tending to rotate in an opposite direction during the portion of the valve operating cycle in which said rocker arm has first quadrant counterclockwise rotation thereby reversing the direction of the moment $Mb$, the frictional moment existing between said eccentric and said biasing means, the moment $Mc$, the frictional moment existing between the positioning surface of said rocker arm and the eccentric portion engaged therewith, and the moment $Md$, the frictional moment existing between the working face of the eccentric and the valve stem, the sum of the moments $Ma$, the constant continuous unidirectional moment produced by said biasing means, plus $Mb$, the frictional moment existing between said eccentric and said biasing means, plus $Mc$, the frictional moment existing between the positioning surface of said rocker arm and the eccentric portion engaged therewith, being less than the sum of the moment $Md$, the frictional moment existing between the working face of the eccentric and the valve stem, plus $Me$, the moment created by the force of said valve spring, so that said eccentric rotates with respect to said rocker arm during said rocker arm first quadrant counterclockwise rotation thereby creating a lash between said eccentric and the valve stem when said valve has completed an operating cycle, the moment $Ma$, the continuous unidirectional movement produced by said biasing means, being greater than the sum of the moments $Mb$, the frictional moment existing between said eccentric and said biasing means, plus $Mc$, the frictional moment existing between the positioning surface of said rocker arm and the eccentric portion engaged therewith, at the end of said valve cycle so that said eccentric will rotate and take up the lash created.

17. In an internal combustion engine valve gear comprising a rocker arm having a recessed curved bearing surface, and an eccentric having a curved bearing surface engaging said recessed curved bearing surface, the contour of said curved bearing surface being such that the surfaces are in tangential contact at two pre-selected spaced points, said eccentric having a tendency to rotate with respect to said rocker arm about a center of rotation during a valve operating cycle, the rotation of said eccentric being opposed by a frictional moment existing between the curved bearing surfaces, the magnitude of said frictional moment being a function of the included angle between lines through said points of contact and said center of rotation.

18. In an internal combustion engine valve gear comprising a rocker arm having a bearing surface, and an eccentric having a bearing surface, one of said bearing surfaces being recessed to receive the other of said surfaces, the contour of said bearing surfaces being such that the surfaces are in contact at two pre-selected spaced locations, said eccentric having a tendency to rotate with respect to said rocker arm about a center of rotation during a valve operating cycle, the rotation of said eccentric being opposed by a frictional moment existing between the bearing surfaces, the magnitude of said frictional moment being a function of the included angle between median lines through said contact locations and said center of rotation.

References Cited in the file of this patent

UNITED STATES PATENTS

| | | |
|---|---|---|
| 1,948,063 | Burkhardt | Feb. 20, 1924 |
| 1,950,590 | Berry | Mar. 13, 1934 |
| 2,706,974 | Vemaire | Apr. 26, 1955 |
| 2,791,206 | Engemann | May 7, 1957 |
| 2,827,028 | Dadd | Mar. 18, 1958 |

FOREIGN PATENTS

| | | |
|---|---|---|
| 1,066,872 | France | Jan. 27, 1954 |